US008620778B2

(12) United States Patent
Malkareddy

(10) Patent No.: US 8,620,778 B2
(45) Date of Patent: Dec. 31, 2013

(54) DOCUMENT VAULT AND APPLICATION PLATFORM

(75) Inventor: Jagan M. Malkareddy, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 871 days.

(21) Appl. No.: 12/356,331

(22) Filed: Jan. 20, 2009

(65) Prior Publication Data

US 2010/0185473 A1 Jul. 22, 2010

(51) Int. Cl.
| | | |
|---|---|---|
| G07B 17/00 | (2006.01) | |
| G07F 19/00 | (2006.01) | |
| G06F 17/00 | (2006.01) | |
| G06F 17/20 | (2006.01) | |
| G06F 17/24 | (2006.01) | |
| G06F 17/22 | (2006.01) | |
| G06Q 10/10 | (2012.01) | |
| G06Q 40/00 | (2012.01) | |

(52) U.S. Cl.
CPC .......... *G06F 17/241* (2013.01); *G06F 17/2247* (2013.01); *G06Q 10/10* (2013.01); *G06Q 40/10* (2013.01); *Y10S 707/99931* (2013.01); *Y10S 707/99932* (2013.01)
USPC ............. 705/30; 715/230; 715/234; 715/243; 715/252; 709/223; 709/224; 705/2; 705/14.58; 705/51; 705/57; 707/999.001; 707/999.002

(58) Field of Classification Search
CPC ... G06F 17/241; G06F 17/2247; G06Q 10/10; G06Q 5/22; G06Q 40/10
USPC ...................... 705/2, 10, 30, 34, 35, 26.1; 1/1; 715/274, 234, 230, 229; 726/28, 30; 709/206
See application file for complete search history.

(56) References Cited

U.S. PATENT DOCUMENTS

| | | | | |
|---|---|---|---|---|
| 6,029,195 | A * | 2/2000 | Herz | 725/116 |
| 6,721,783 | B1 * | 4/2004 | Blossman et al. | 709/206 |
| 6,981,040 | B1 * | 12/2005 | Konig et al. | 709/224 |
| 7,054,841 | B1 * | 5/2006 | Tenorio | 705/57 |
| 7,107,285 | B2 | 9/2006 | von Kaenel et al. | |
| 7,299,412 | B1 * | 11/2007 | Hull et al. | 715/234 |
| 7,383,212 | B1 * | 6/2008 | Cleveland et al. | 705/35 |
| 7,581,176 | B2 * | 8/2009 | Wilson | 715/243 |
| 7,603,352 | B1 * | 10/2009 | Vassallo et al. | 1/1 |

(Continued)

OTHER PUBLICATIONS

Hawkins, D. T. (1994). Electronic advertising on online information $y$tem$. Online, 18(2), 26. Retrieved from http://search.proquest.com/docview/199919858?accountid=14753.*

(Continued)

*Primary Examiner* — Matthew Gart
*Assistant Examiner* — Olusegun Goyea
(74) *Attorney, Agent, or Firm* — Wolfe-SBMC

(57) ABSTRACT

Online document storage and/or retrieval techniques are described. In an implementation, one or more computer-readable media comprising instructions that are executable to provide a web service application programming interface (API). The web service API is configured to accept a document and information specified by the document's provider. The information specifying which of a plurality of tabs in a user interface at least a portion of data included in the document is to be associated with for display in which at least one of the tabs pertains to billing data and another one of the tabs does not pertain to billing data.

18 Claims, 7 Drawing Sheets

(56) References Cited

U.S. PATENT DOCUMENTS

| | | | | |
|---|---|---|---|---|
| 7,685,276 | B2* | 3/2010 | Konig et al. | 709/224 |
| 7,747,523 | B2* | 6/2010 | Cohen | 705/39 |
| 7,848,972 | B1* | 12/2010 | Sharma | 705/34 |
| 8,099,397 | B2* | 1/2012 | Felderman et al. | 707/667 |
| 8,352,573 | B2* | 1/2013 | Chandra | 709/218 |
| 2003/0036927 | A1* | 2/2003 | Bowen | 705/4 |
| 2003/0097331 | A1* | 5/2003 | Cohen | 705/39 |
| 2003/0110130 | A1* | 6/2003 | Pelletier | 705/50 |
| 2003/0140315 | A1* | 7/2003 | Blumberg et al. | 715/527 |
| 2003/0217034 | A1* | 11/2003 | Shutt | 707/1 |
| 2004/0081951 | A1* | 4/2004 | Vigue et al. | 434/350 |
| 2004/0095378 | A1* | 5/2004 | Vigue et al. | 345/723 |
| 2004/0187075 | A1* | 9/2004 | Maxham et al. | 715/511 |
| 2004/0205580 | A1* | 10/2004 | De Angelis et al. | 715/513 |
| 2005/0055337 | A1* | 3/2005 | Bebo et al. | 707/3 |
| 2005/0193330 | A1* | 9/2005 | Peters | 715/513 |
| 2005/0203885 | A1* | 9/2005 | Chenevich et al. | 707/3 |
| 2006/0004819 | A1* | 1/2006 | Claudatos et al. | 707/101 |
| 2006/0031077 | A1* | 2/2006 | Dalton et al. | 705/1 |
| 2006/0200445 | A1* | 9/2006 | Chen et al. | 707/2 |
| 2006/0271543 | A1* | 11/2006 | Dodson et al. | 707/9 |
| 2007/0078853 | A1* | 4/2007 | Shutt | 707/8 |
| 2007/0088671 | A1* | 4/2007 | McElroy et al. | 707/1 |
| 2007/0174079 | A1* | 7/2007 | Kraus | 705/1 |
| 2007/0192279 | A1* | 8/2007 | Van Luchene | 707/1 |
| 2007/0245227 | A1* | 10/2007 | Hyland et al. | 715/505 |
| 2007/0289022 | A1* | 12/2007 | Wittkotter | 726/27 |
| 2008/0052111 | A1* | 2/2008 | McMenimen et al. | 705/2 |
| 2008/0134295 | A1* | 6/2008 | Bailey et al. | 726/4 |
| 2008/0183905 | A1* | 7/2008 | Kitada | 710/8 |
| 2008/0228524 | A1* | 9/2008 | Brown | 705/3 |
| 2009/0025092 | A1* | 1/2009 | Smith et al. | 726/30 |
| 2009/0177754 | A1* | 7/2009 | Brezina et al. | 709/206 |
| 2009/0248512 | A1* | 10/2009 | Su et al. | 705/14 |
| 2009/0276406 | A1* | 11/2009 | Kelley | 707/3 |
| 2010/0005015 | A1* | 1/2010 | Ghuman et al. | 705/30 |
| 2010/0036712 | A1* | 2/2010 | Abrahamsohn | 705/10 |
| 2010/0138311 | A1* | 6/2010 | Pieraldi et al. | 705/26 |
| 2010/0180348 | A1* | 7/2010 | Dodson et al. | 726/28 |
| 2010/0280948 | A1* | 11/2010 | Cohen | 705/42 |

OTHER PUBLICATIONS

"Mera Windows", http://www.merawindows.com/Forums/tabid/324/forumid/21/threadid/12367/scope/posts/Default.aspx .

"SkyDrive Has Now 5GB for your Files", http://www.efluxmedia.com/news_SkyDrive_Has_Now_5GB-For_YourFiles_14328.html.

"XDrive Online Backup—Part II", http://www.helpmerick.com/xdrive_online_backup_part_ii.htm.

"Office Rocker!", http://blogs.msdn.com/officerocker/archive/2008/02/22/rnadon-catch-up-22nd-feb.aspx.

"Signing up for Macy's Online Bill Payment", https://mycheckfree.com/br/wps?&esc=3029319&sp=0001&rq=gf&file=quick_en-roll_help.html#NET_Passport.

"Amazon S3 Simple Storage Service—Everything you Wanted to Know", http://www.labnol.org/internet/tools/amazon-s3-simple-storape-service-guide/3889/.

"Microsoft SkyDrive UMicrosoft SkyzDrive Ups Free Online Storage to 5GBps Free Online Storage to 5GB", http://www.bloglines.com/blog/emailsupport.

* cited by examiner

DOCUMENT VAULT AND APPLICATION PLATFORM

BACKGROUND

Online data storage has been developed to allow user to access to data, such as documents over a network. In a typical online storage scenario, a web browser may be used to access documents that are stored on a remote server.

However, even though online document storage permits users to access the document from various locations, online document storage was inefficient. Often times, the documents and related data are associated with several accounts, stored on different servers, and so on. For example, a user may have a HOTMAIL (Microsoft Corporation, Redmond, Wash.) account to store electronic mail/documents as attachments, a WEB MD (WebMD LLC, New York, N.Y.) account to store medical records, and a bill pay account to store bills and bank statements. Consequently, online document storage is tedious and inconvenient, and as a result, users may limit online document storage to key documents.

SUMMARY

Online document storage and/or retrieval techniques are described. In an implementation, one or more computer-readable media comprise instructions that are executable to provide a web service application programming interface (API). The web service API is configured to accept a document and information specified by the document's provider. The information specifies which of a plurality of tabs in a user interface at least a portion of data included in the document is to be associated with for display in which at least one of the tabs pertains to billing data and another one of the tabs does not pertain to billing data.

In a further implementation, a billing statement and information specified by the billing statement's provider are accepted automatically. The information specifies which of a plurality of tabs in a user interface at least a portion of data included in the billing statement is to be associated with for display. The implementation further includes accepting a document that is not a billing statement with information specified by the document's provider. The information specifies which of a plurality of tabs in a user interface at least a portion of data included in the document is to be associated with for display. A user interface is configured to be accessible via a network by a browser. The user interface is configured to provide access to the at least a portion of data included in the billing statement that is organized according to the information specified by the billing statement's provider. The user interface is also configured to provide access to the at least a portion of data included in the document organized according to the information specified by the document's provider.

In another implementation, one or more computer-readable media comprise instructions that are executable to organize display of at least a portion of data included in a billing statement based on information specified by the billing statement's provider. The information specifies which of a plurality of tabs in a user interface the at least a portion of data is to be associated with for display. The instruction are also configured to present an advertisement selected from a plurality of advertisements based on the at least a portion of data to collect revenue.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
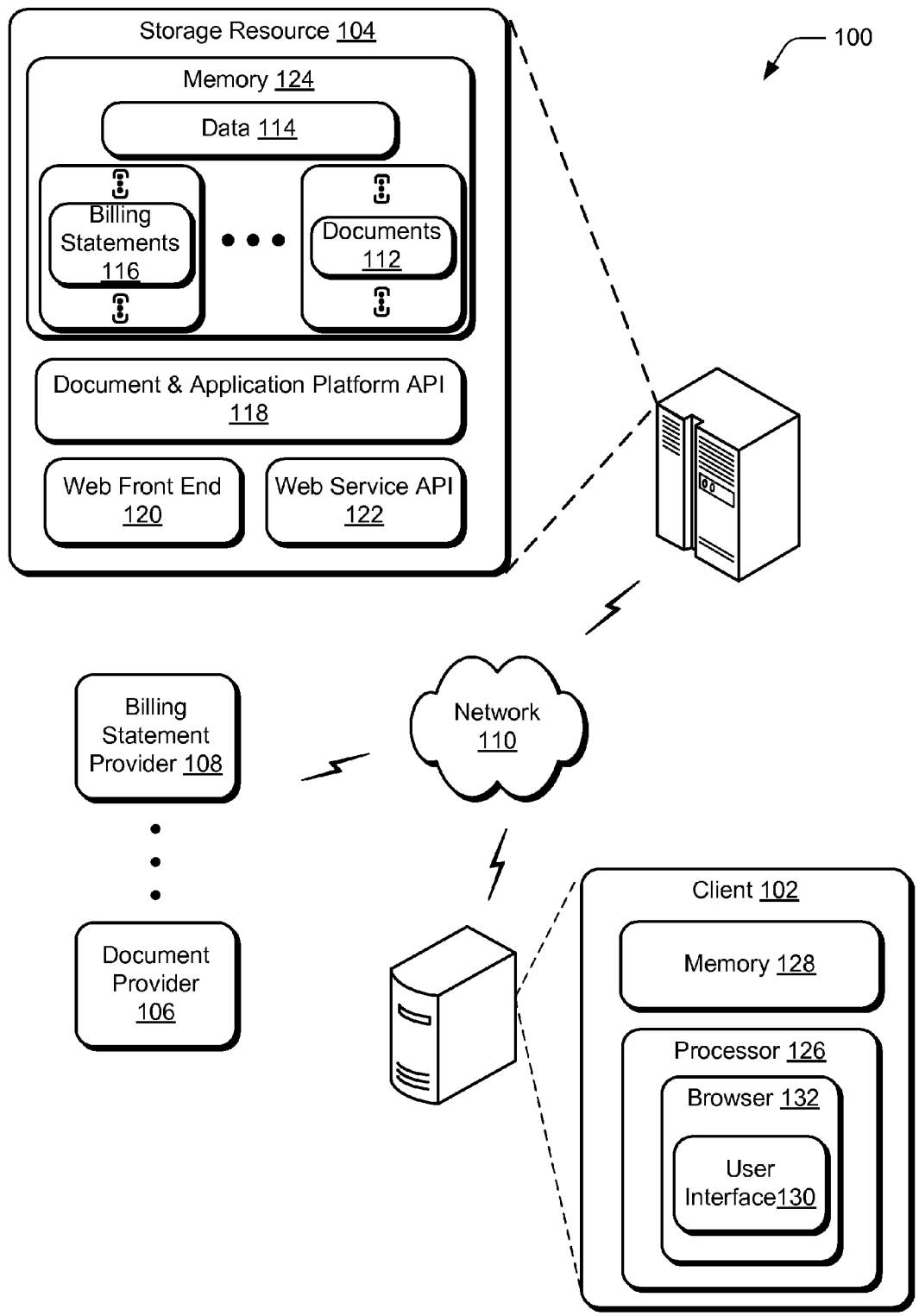
FIG. 1 is an illustration of an environment in an example implementation that is operable to perform online document storage techniques.

Conventional online data storage providers (e.g., mycheckfree.com, WebMD.com) may limit what data and documents may be stored to a particular type of data and documents. Types of documents may include, medical records, billing records, school records, and so on. However, limiting online document storage may result in inefficient access as users are forced to store documents among numerous data storage providers. For example, a user may have accounts spread across a variety of websites, such as a medical history website, a billing service website, and a social networking website. Furthermore, online document storage may be complicated by storage providers that use different interfaces, rules, account numbers, and passwords. As a result, users often choose to limit online document storage to key documents.

Online document storage and/or retrieval techniques are described. In an implementation, a web service application program interface (API) is configured to organize (e.g., accept, store, arrange, and so on) different types of documents for display. A web front end may be used by an application to display each document based on information provided with the document. For example, the web service API may accept the document and information from the document's provider. By configuring the web service API in this manner, the web service API may use the information to organize under which tab in a user interface the data included in the document and/or the document is to be displayed when accessed via a web front end. In this way, a browser may be used to access documents and data included in the documents via a network and the web front end. The user interface using the web front end may display the data and documents according to the information specified by the document's provider. For example, the web front end may display a billing statement for a medical test and a medical record for the medical test under a medical tab. In the previous example, the web service API may also organize storage of the data from the medical record and billing statement in a common directory.

Although the information provided with a document may reflect data in the document, in some instances the information may be different. For example, the information may be an email that includes a document. The web service API may use the information to organize display of the document and/or data included in the document in a user interface. In an example, a user interface may display telephone bill data under a tab for a month using the web front end corresponding to the telephone bill's due date as organized by the web service API.

An application can be developed using the platform API, to make use of the web service API and/or the web front end in generating and/or displaying a report that contains data included in the document. In one implementation, the application links the data included in the document to the document itself. Thus, to view a telephone bill via the application and the web front end, a user can click-on data included in the telephone bill. For example, a user may click-on a billing amount, a telephone company name, or a due date in the report to display the telephone bill.

In the following discussion, an example environment and systems are first described that is operable to perform one or more techniques that may be use to organize display of documents stored online. Example procedures are then described that may be implemented using the example environment as well as other environments. Accordingly, implementation of the procedures is not limited to the environment and the environment is not limited to implementation of the procedures.

Example Environment

FIG. 1 is an illustration of an environment 100 in an example implementation that is operable to employ online document storage techniques. The illustrated environment 100 includes a client 102, a storage resource 104, a document provider 106, and a billing statement provider 108 communicatively coupled by a network 110. For convenience of the discussion, each of the members of the environment 100 may represent multiple entities. For example, the billing statement provider 108 may represent multiple providers of billing statements. Example billing statement providers include AT&T Inc., Amazon.com, Inc., Sprint, and so forth.

The storage resource 104 is operable to store documents 112 and data 114 included in the documents 112 for access via the network 110. For convenience in the discussion, at times data 114 included in the document 112 may also be referred to as data 114. While the foregoing convention is used, at times data may refer to other data and so on. The applicable meaning may be determined from the context of the discussion. The storage resource 104 may also store information from the document provider 106 that is included with but not in the document 112.

The storage resource 104 may be configured to store multiple types of documents 112. The storage resource 104 may store financial and non-financial documents 112 in a single account. For example, the storage resource 104 may be used to store billing statements 116, receipts, rebates, resumes, records, correspondence, and so on.

Moreover, the storage resource 104 may store documents 112 in different formats. Example document formats include but are not limited to, WORD (Microsoft, Corp., Redmond Wash.), ADOBE ACROBAT (Adobe Systems, San Jose, Calif.), rich text format, tagged image files, and so forth. As discussed above, the storage resource 104 may store data. For example, the storage resource 104 may also store information that is associated with a document 112.

As further illustrated, the storage resource 104 includes a document and application platform API 118 (platform API), a web front end 120, a web service API 122, and memory 124. By configuring the platform API 118 and the web service API 122 in this manner, application developers may have access to the code used to implement the platform API 118. This may also permit document providers 106 to specify what information is to be used to organize display of the document 112 and/or consumption of the document 112.

The platform API 118, the web front end 120, and/or the web service API 122 may be stored in memory 124, or stored in another memory until called on by one or more processor associated with the storage resource 104. Although the web service API 122 is illustrated on the storage resource 104, the web service API 122 may reside in a variety of locations.

The platform API 118 is representative of functionality that is operable to organize display of documents 112 and data 114 in memory 124 in conjunction with the web service API 122. For example, the platform API 118 and the web service API 122 may organize display of data 114 and documents 112 so that the data 114 and documents 112 are each displayed in association with one or more of a plurality of tabs. In this way the platform API 118 may act as a platform for one or more application that may interact with the document and/or data. In addition, the platform API 118 may be used to develop applications that may consume the documents 112 and/or data 114. Although the web service API 122 and web front end 120 are illustrated separately, in some implementations the web service API 122 and/or the web front end 120 may be combined or included as part of the platform API 118.

In one or more embodiments, an application built with the platform API 118 may use the web front end 120 to access a report that includes data 114. For example, an application may leverage the platform API 118 as part of generating the report. The report may include data 114 for a document 112 or group of documents. The web service API 122 may associate data 114 with the document 112. For example, the web service API 122 may link the data 114 with the document 112. As a result, a user may be able to click-on the data 114 in the report to access the document 112.

The web front end 120 may also be configured to maintain multiple accounts. The web front end 120 may use the accounts to limit access, allocate storage capacity, and so on. In addition, the web front end 120 may use the accounts to control organization of documents 112 in the account.

In another implementation, the web front end 120 and the platform API 118 are configured to share data and documents 112 among accounts. Thus, the web front end 120 and the platform API 118 may permit users to send a copy of a document 112 and/or data 114 to other accounts with the storage resource 104. For instance, the web front end 120 and the platform API 118 may permit a husband and wife to share financial documents 112 among their respective accounts. When sharing documents 112, the web front end 120 may display the document 112 based on how the document 112 was displayed in an originating account. For example, when the web front end 120 displays a document 112 as associated with a resume tab in a first account, the web front end 120 may be used to display the document 112 with a resume tab in a second account.

In one or more embodiments, the web service API 122, web front end 120, and/or the platform API 118 may perform additional functions. Additional functions may include, but is not limited to, extracting data 114 from content that forms a document 112, consuming the content that forms the document, and/or authenticating access to accounts with the storage resource 104 and/or document providers 106. For example, the web service API 122 may be configured to extract data 114 included in the document 112 for inclusion in a report. In this way, application providers may configure applications to consume data from the document providers forwarded via the storage resource 104.

In another example, the web service API 122 may perform authentication functions. Thus, the web service API 122 may provide a user name and a password to the billing statement provider 108 (e.g., AT&T that calls the web service API 122) such that a user may avoid manual authentication with the billing statement provider 108.

The web service API 122 is representative of functionality to interface with applications/programs that supply data for storage. For example, the web service API 122 may be used to store a billing statement (e.g., a utility bill) accepted from billing statement provider 108, e.g., a utility company's billing system. In another example, an application built on the platform API 118 may use the web service API 122 to obtain data and/or documents from the document provider 106. For example, a bill application may specify account information with a billing statement provider such that the web service API 122 may retrieve the documents and/or data.

By configuring the web service API 122 in this manner, the document providers 106 may send information that specifies how the document 112 is to be organized by the web service API 122. Example information for the utility bill example (above) may include bill amount, due date, billing month, and so on. As noted above, this information may correspond with data 114 included in the document 112 itself.

Applications built using the platform API 118 may interact with the stored data and documents using the platform API 118 to organize (e.g., access, manipulate, and so on) data 114 and documents 112 in the memory 124. Thus, the application may appear as a tab in a user interface 130 through the web front end 120. In this way, applications may leverage the web front end 120 and/or web service API 122 when interacting with the data.

In one or more embodiments, the storage resource 104 includes applications that interact with the data and documents 112. The applications may leverage the web front end 120 and/or the web service API 122 to store/interact with the data. In additional instances, the application may be accessed in other ways, e.g., in a remote access session.

Although a single memory 124 is shown for the storage resource 104, a wide variety of types and combinations of memory may be employed, such as random access memory (RAM), hard disk memory, removable medium memory, and other types of computer-readable media. While the memory 124 is illustrated as included in the storage resource 104, in some embodiments the memory 124 may be comprised of separate devices that are associated with the storage resource 104. For example, a redundant array of independent disks (RAID) may be used to store data.

The client 102 is further illustrated as including a processor 126 and memory 128. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although the client 102 is illustrated with a single memory 128, a wide variety of types and combinations of memory may be employed, such as random access memory (RAM), hard disk memory, removable medium memory, and other types of computer-readable media.

As illustrated, the client 102 includes a user interface 130 that is output in a web browser 132. The user interface 130 is representative of functionality to interact with the applications via the web front end 120 and the browser 130 over the network 110. Interacting may include but is not limited to managing, manipulating, outputting, and/or accessing data on the storage resource 104. For example, the user interface 130 may display a report that includes data 114 for one or more documents 112 stored on the storage resource 104. The user interface 130 may interact with the platform API 118 and thus data in memory 124 using the web service API 122. In some embodiments, the user interface 130 may be downloaded from the storage resource 104, stored in the memory 128, partially maintained on the storage resource 104 and on the client 102, and so forth.

The document provider 106 and the billing statement provider 108 represent entities that forward data for online storage. Example document and billing statement providers 106, 108 include, but are not limited to, phone service providers, retailers, utilities, employment service, and health care providers. The document provider 106 and the billing statement provider 108 may provide different types of documents. Example document types include, but are not limited to financial, non-financial, medical, and so on.

In some instances, information and documents 112 may be communicated through a third party. For example, a hospital may forward the client 102 an email that includes a medical record. In turn, the client 102 may re-forward the email message and/or the medical record to the storage resource 104. Forwarding is discussed in further detail with respect to FIG. 2.

Although the network 110 is illustrated as the Internet, the network 110 may assume a wide variety of configurations. For example, the network 110 may be a wide area network (WAN), a local area network (LAN), a wireless network, a public telephone network, an intranet, and so on. Further, although a single network 110 is shown, the network 110 may be configured to include multiple networks. A wide variety of other instances are also contemplated.

Generally, any of the functions described herein can be implemented using software, firmware (e.g., fixed logic circuitry), manual processing, or a combination of these implementations. The terms "module," "functionality," "service," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, such as the memory. The features of the online data storage and/or retrieval techniques described herein are platform-independent, meaning that the techniques may be implemented on a variety of commercial computing platforms having a variety of processors.

Figure 2:
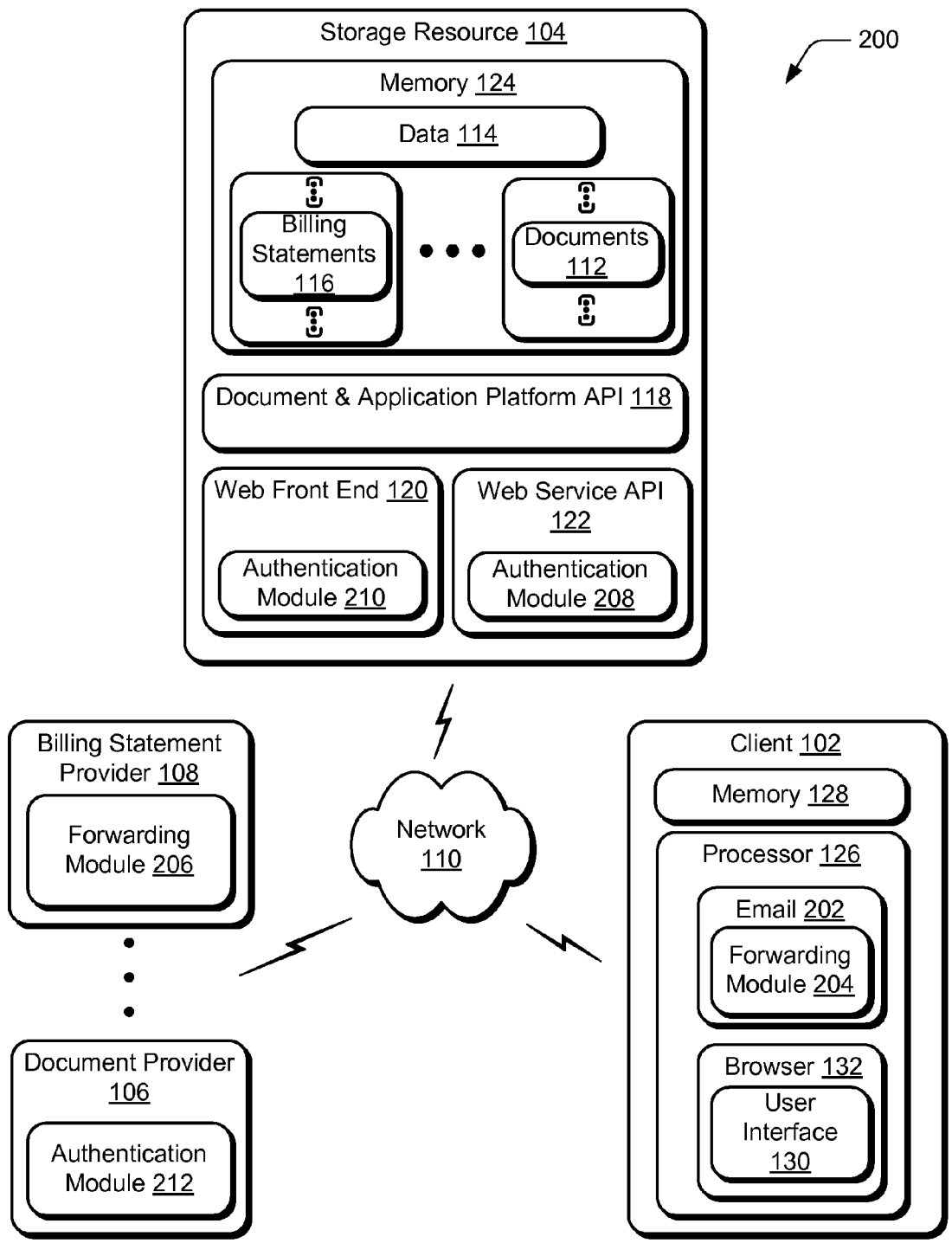
FIG. 2 is an illustration of a system in an example implementation in which document forwarding and authentication are shown in greater detail.

FIG. 2 depicts a system 200 in an example implementation in which the client 102 and the billing statement provider 108 may forward documents 112 for online storage. As illustrated, the client 102 includes an email application 202 that has a forwarding module illustrated as email forwarding module 204. Similarly, the billing statement provider 108 is illustrated as including a forwarding module 206. The forwarding modules 204, 206 are representative of functionality to forward data for online storage. As noted above, data may include documents 112, data 114 included in documents 112, information, and/or other data for storage.

In some implementations, the email forwarding module 204 is provided as an applet or a plug-in that may be downloaded for use with the email application 202. In other instances, the functionality provided by the email forwarding module 204 may be provided on behalf of the email application 202. For example, the user interface 130 may be used to forward emails and/or documents (e.g., attachments) for the email application 202.

The email forwarding module 204 may forward a document 112 for online storage. In other instances, the email forwarding module 204 may forward the document 112 and an email message that contains the document 112 as an attachment to the storage resource 104. The email forwarding module 204 may forward the (original) document 112 and email or a copy of the document 112 and email.

In an implementation, the email forwarding module 204 is configured to cause the email application 202 to present an icon, such as a button, that is operable to automatically forward an email message and/or a document 112 attached to the email (e.g., an email attachment) to the storage resource 104. For example, selection of the button may cause the email application to forward the document 112 for storage in an account on the storage resource 104. In the previous example, the document 112 may have been received from one of the document providers 106.

In other implementations, the email forwarding module 204 applies a set of rules to incoming emails to automatically forward documents 112 for online storage. In this way, the email forwarding module 204 may automatically forward documents 112 without user intervention. For example, the set of rules may specify that emails from a user's doctor are to be stored online. In the previous example, the user may establish or override the set of rules. The email forwarding module 204 may check whether the email meets the set of rules based on one or more of the email, data in the email, and so forth.

As noted above, the billing statement provider 108 includes the forwarding module 206. The forwarding module 206 is representative of functionality to forward a document 112. For example, the forwarding module 206 may forward a document 112 associated with a financial transaction. For example, the forwarding module 206 may be included in an electronic payment system for the billing statement provider 108. Example electronic payments may be made in a variety of ways. For example, payment methods include, but are not limited to, credit cards, gift cards, consumer accounts, check cards, debit cards, customer identification cards, electronic checks, and so forth.

The payment methods may implement various technologies. Example technologies include but are not limited to magnetic encoded information, information communicated using a radio frequency technology, and so forth.

In an implementation, the storage resource 104 may obtain account information from the forwarding module 206. The account specified by the account information may be associated with online storage capacity reserved for a particular user. For example, the forwarding module 206 may obtain account information from financial information (e.g., credit card information) used to conclude a financial transaction. In this way, the forwarding module 206 may identify that a credit card used to purchase an item belongs to a user who has an account with the storage resource 104.

While account information may be obtained from the financial information itself, in other instances the account information may be included with the financial information. For example, a user's online storage account may be included with the financial information, e.g. debit card information.

In an implementation, the forwarding module 206 may be configured to forward data associated with the financial transaction to the storage resource 104. For example, the forwarding module 206 may forward a document 112 that is associated with a financial transaction. Documents 112 may include a billing statement, a receipt, a rebate, a coupon, a warranty, product information, and so forth. A variety of other examples are also contemplated.

Additionally, FIG. 2 illustrates an example implementation in which authentication techniques are discussed. Although forwarding techniques and structures were also described with regard to FIG. 2 it is to be apparent that the forwarding techniques and structures may be used separately or in combination with the described authentication techniques, structures, and approaches.

As illustrated, the web service API 122 and web front end 120 include authentication modules, respectively, 208, 210 and the document provider 106 includes an authentication module 212. The authentication modules 208, 210, and 212 are representative of functionality to control access, storage of documents 112, data, and information. For example the authentication modules 208, 210 may authenticate for the web front end 120 account logins for multiple users and/or with document providers 106. Accordingly, the authentication module 208 may be used to authenticate documents providers 106 and/or billing statement providers 108. Account logins, such as via the web front end 120 and authentication module 210 may include entering a user name, a password, questions used to determine whether a human is entering data (e.g., human interaction proof (HIP)). For example, the user interface 130, that accesses the storage resource 104 via the web front end 120, may display a HIP challenge and a request for a user name and password before access is granted to an account with the storage resource 104. In addition, authentication may involve the use of question used to confirm an identity of user. For example, the user may be asked to provide answer to a personal question, such as where the user was born.

In some implementations, the authentication module 208 may automatically authenticate with one or more document providers 106. For example, the authentication module may automatically authenticate with the authentication module such that a user can access the document provider 106 without performing a manual authentication. The authentication modules may perform the automatic authentication at a variety of times. For example, the authentication modules 208, 210 may automatically authenticate in response to a user linking to a document 112 provided by the document provider 106, and so forth.

Figure 3:
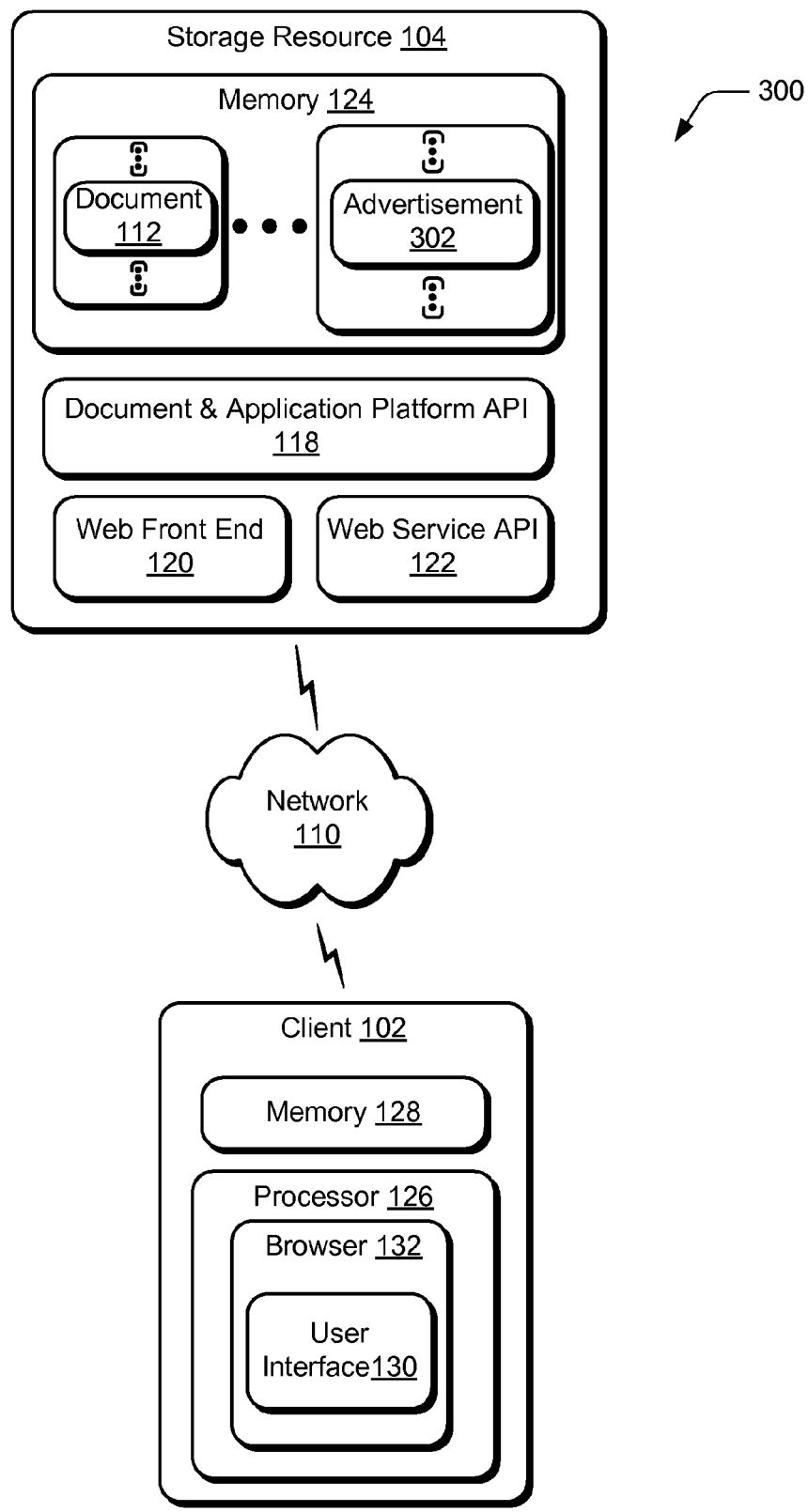
FIG. 3 is an illustration of a system in an example implementation showing advertising revenue generation.

FIG. 3 depicts a system 300 in an example implementation in which an advertising model is used to generate revenue. The system 300 may be used in conjunction with the techniques, approaches, structures described in FIGS. 1 and 2.

As illustrated, the storage resource 104 may store one or more advertisements 302 in the memory 124. For example, the platform API 118 using the web front end 120 may present an advertisement 302 and data for display on the user interface 130. In other instances, the web front end 120 may present an advertisement 302 separate from a display of data 114 or a document 112 that triggers presentation of the advertisement 302. For example, the platform API 118 may present an email advertisement in an email on the user's cell phone after the user views the document 112 with the user interface 130.

In one or more examples, the web front end 120 performs targeted advertising based on information or data 114 included in a document 112. In this way, the web front end 120 may present an advertisement 302 for a product or service based on data 114 included in the document 112. For instance, the web front end 120 may present an advertisement 302 for a cell phone service when data 114 included in the document 112 identifies the document 112 as a cell phone statement. Moreover, the web front end 120 may target advertisements when data changes. For example, the web front end 120 may provide an advertisement for cell phone service based on an increase in a cell phone billing statement in comparison to a previous cell phone billing statement.

The web service API 122 may be configured to accept advertising from the document provider 106. For example, when the billing statement provider 108 sends a billing statement, the web service API 122 may offer the billing statement provider 108 an opportunity to pay for presentation of an advertisement 302 to be displayed when the billing statement is accessed.

The web service API 122 and/or the web front end 120 may also perform other revenue generation and advertising functions. Revenue generation functions may include data storage functions that are associated with generating revenue. The web service API 122 and/or the web front end 120 may allocate storage capacity in memory 124 based on whether an account is scheduled to receive advertisements 302. As a result, an account may be allocated more storage space in memory 124 when the account receives advertisements 302. The amount of storage capacity allocated to an account may depend on a variety of factors. Example factors include whether advertisements 302 are viewed, a rate at which documents are received, and so forth.

In other instances, the web front end 120 may permit users to opt out of receiving advertisements. For example, the web service API 122 and/or the web front end 120 may be configured to allocate storage space based on monthly fee model. In this scenario, the web front end 120 may assess a monthly fee based on an account's storage capacity. A variety of other examples are also contemplated, further discussion of which may be found in relation to the following procedures.

Figure 4:
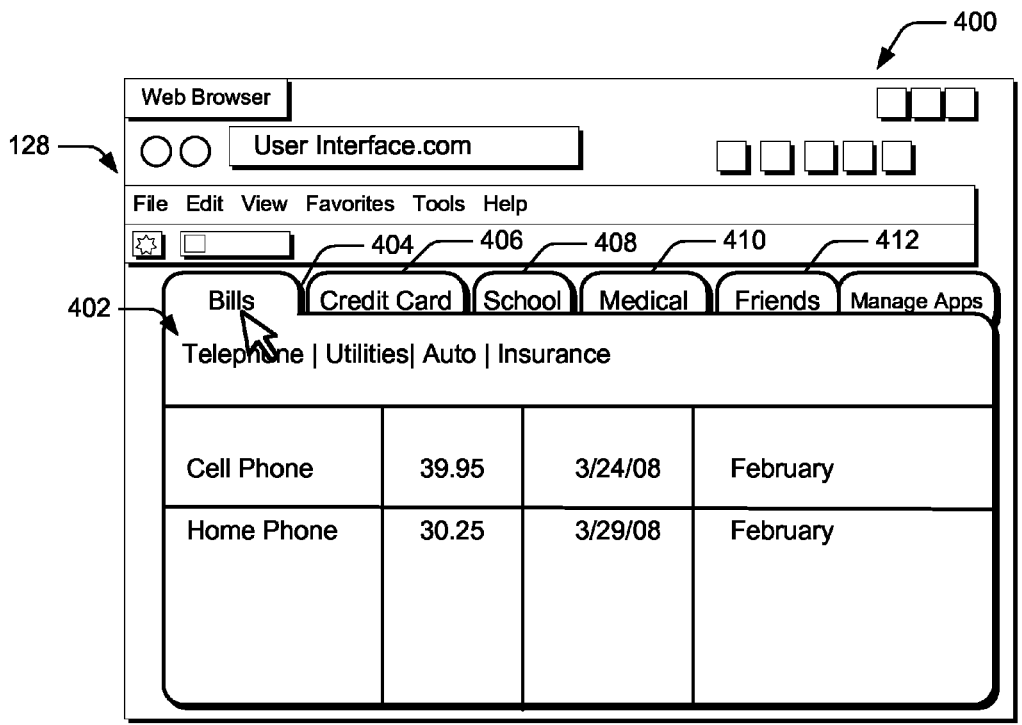
FIG. 4 is an illustration of a user interface in an example implementation showing displaying a report.
Figure 5:
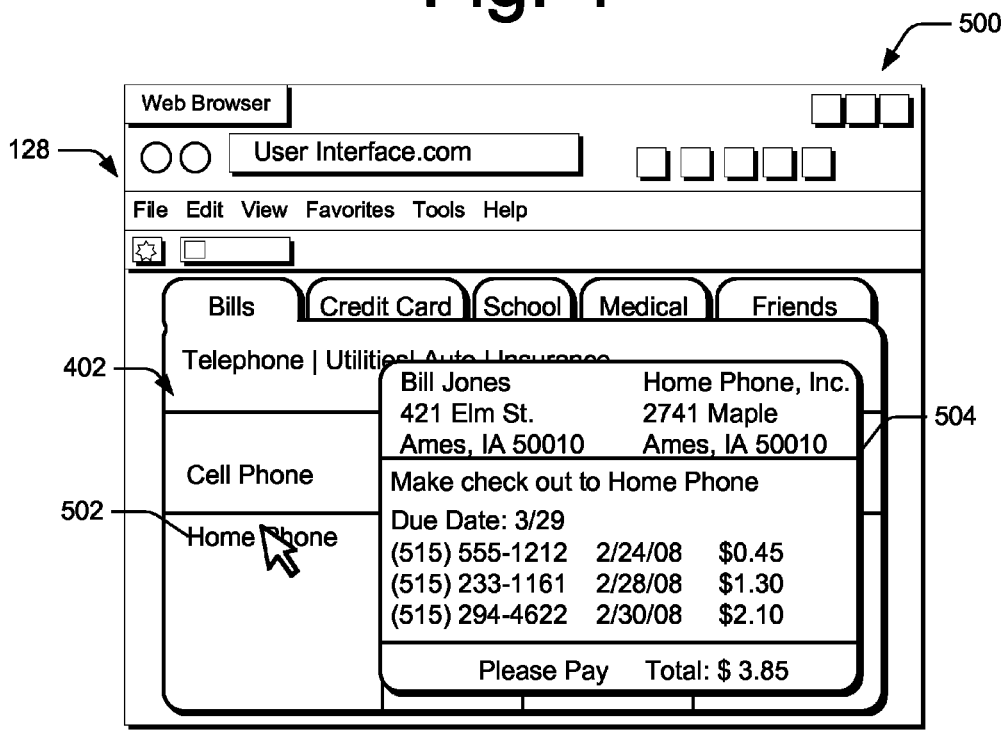
FIG. 5 is an illustration of a user interface in an example implementation showing displaying a billing statement.
Figure 6:
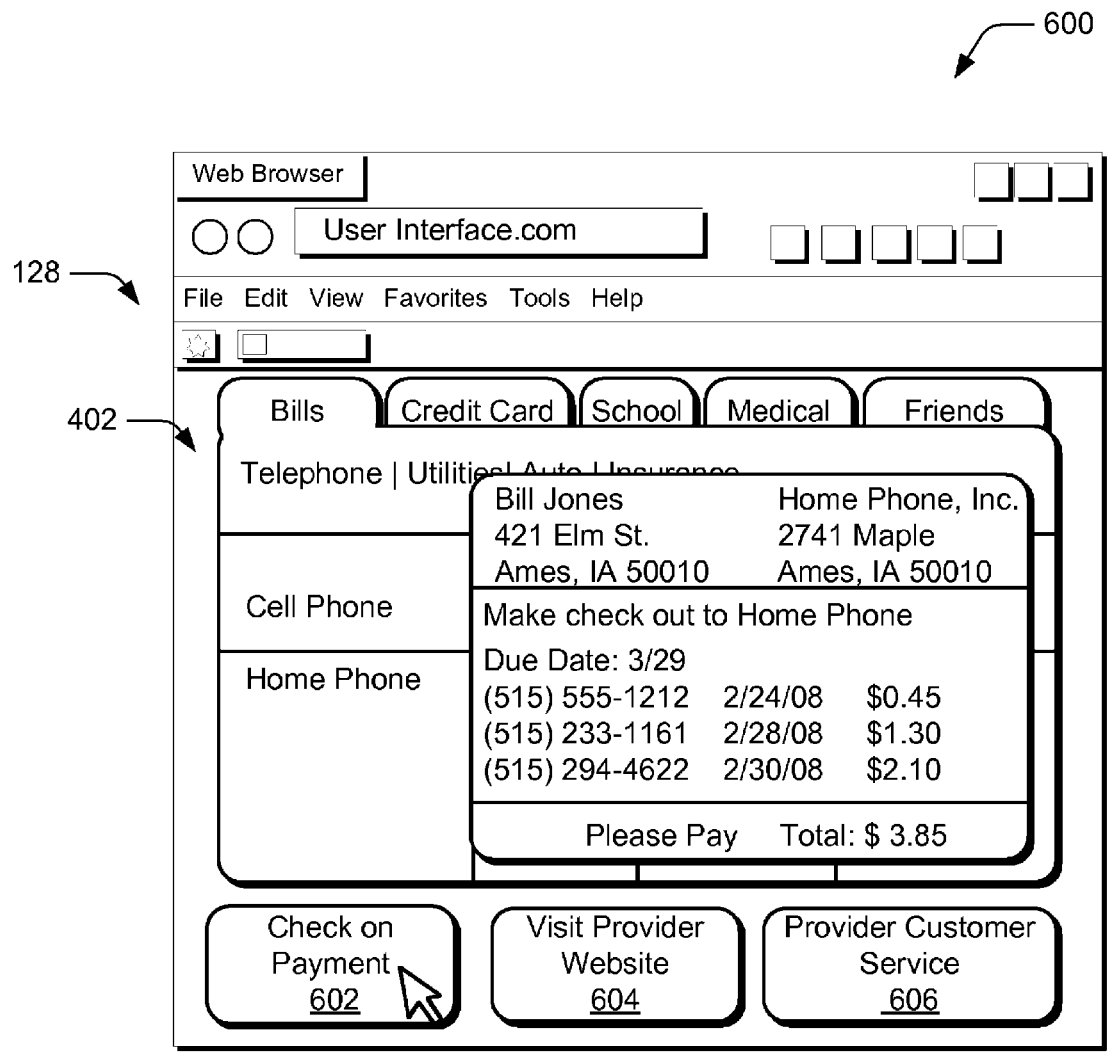
FIG. 6 is an illustration of a user interface in an example implementation that shows using the user interface to interact with a document provider.

FIGS. 4 through 6 depict example implementations in which the user interface 130 of FIGS. 1 through 3 is illustrated as displaying a report 402. In some instances, the report may be provided by an application configured to display the report 402. In the foregoing instances, the application may leverage the platform API 118 and/or the web front end 120 as part of generating the report. For example, an application may implement data and/or documents organized by the web service API 122. For convenience, the browser is numbered 400, 500, and 600, respectively, for FIGS. 4 through 6. The following implementations are included for example only and not limitation. As illustrated in FIG. 4 the user interface 130 includes a plurality of tabs. Example tabs include but are not limited to bills 404, credit card 406, school 408, medical 410, applications, account, unsorted documents, and friends 412. As discussed above, the web service API 122 may be used to organize documents, data included in the documents, information, as well as other data among the tabs.

The web front end 120 may organize display in the user interface 130 based on information specified by the document provider. For example, a billing statement provider may forward information that specifies that the document is a billing statement for home telephone service. Thus, in this instance, the user interface 130 displays data included in the home telephone service billing statement when the bill tab 406 is selected.

The report 402 may be generated by an application built on the platform API 118 of FIGS. 1 through 3. For the purposes of example only and not limitation, the report 402 is illustrated as being organized in a bills tab 404. As illustrated the report 402 includes data for two billing statements. The first billing statement is associated with data that describes a cell phone, 39.95, Mar. 24, 2008, and February. The second billing statement is associated with the data home phone, 30.25, Mar. 29, 2008, and February. As illustrated in FIG. 5, the data displayed in the report 402 may be linked with a document. In the current implementation, a billing application may leverage the platform API 118 and/or web front end 120 to present the report 402. For example, the data "home phone" 502 may be linked to a billing statement for home phone service 504. Other data associated with the billing statement for home phone service 504 may be linked in a similar manner.

In one or more implementations, the user interface 130 may be used to interact with a document provider via the web front end 120. In this manner, the user interface 130 may be used to perform a variety of actions with the document provider. As illustrated in FIG. 6 for example, the user interface 130 may provide buttons that, when selected, permit a user to interact with the document provider. Sample buttons include, but are not limited to, check on a payment 602, visit the document provider's website 604, and access the document provider's customer service online support 606. A variety of other examples are also contemplated.

Example Procedures

The following discussion describes online data storage techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. Further, some implementations may use a subset of the illustrated operations. In portions of the following discussion, reference will be made to the environment 100 of FIG. 1 and the systems 200, 300 of FIGS. 2 and 3, respectively.

Figure 7:
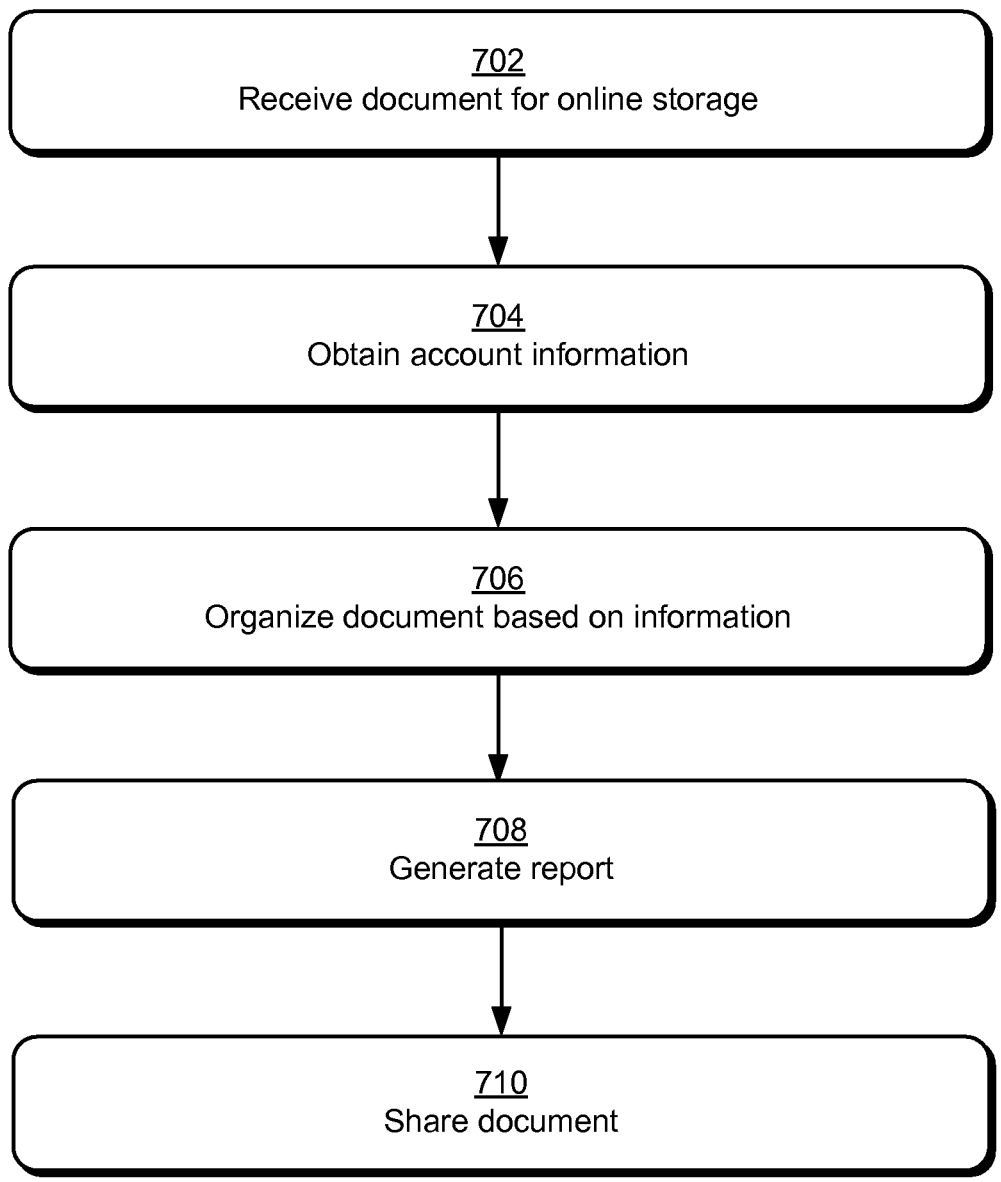
FIG. 7 is a flow diagram depicting a procedure in an example implementation in which a document is organized for display.

FIG. 7 depicts a procedure 700 in an example implementation in which online document storage procedures are used to organize (e.g., collect, store, and so forth) display of data and documents accessed over a network. A document is received for online storage (block 702). For example, the storage resource 104 may receive a document 112 forwarded from the email application 202. The document 112 may be accompanied with information, e.g., an email message. Information may be included with the document 112 but not in the document 112 itself. In an implementation, information specifies with which of a plurality of tabs the document 112 and/or data 114 included in the document 112 is to be associated with for display.

The information may serve to identify or tell something about the document 112. For example, information for a resume may include a date, a prospective employer, a reference, an entity from which the resume was received, and so on. Although in some instances the information may mirror data 114 in the document, in other instances the information may not correspond to data 114 in the document. In this way, the information may include information is beyond content in the document 112.

In one or more implementations, account information is obtained (block 704). Account information may be obtained in a variety of ways, e.g., may be provided with financial information used to conclude a financial transaction. For instance, account information may be included with credit card information used to purchase an item. In other instances, account information may be obtained from the information and/or the document 112 itself. For example, the web service API 122 may obtain account information from a "patient name" in medical test results. In the foregoing example, the web service API 122 may extract the patient's name from the medical test results in order to identify an account associated the patient. A variety of other examples are also contemplated.

The document is organized based on the information (block 706). For example, the web service API 122 may organize a document associated with a hospital under a medical record tab. In contrast, the web service API 122 may organize another document associated with the hospital as a billing statement when the information indicates a total billing amount.

In one or more embodiments, a report is generated that includes data included in the document (block 708). The report may be for a group of documents and/or data 114 included in documents 112 that are organized for display in a common tab using the web front end 120. For example, an application built on the platform API 118 may use the web front end 120 to generate and/or display a report.

In one or more embodiments, the document is shared with another account (block 710). For example, the web front end 120 may be used to share the document 112 (original) or a copy of the document 112 between accounts on the storage resource 104. The web front end 120 may be configured to automatically display the shared document according to how the document 112 was displayed in the originating account. For instance, when a first account displayed a document 112 in a school record tab, a second account may also display the document 112 in the school record tab. In the previous example, the document 112 may be organized and/or displayed based on information that identifies the document 112 as a transcript. A variety of other examples are also contemplated without departing from the spirit and scope thereof.

Figure 8:
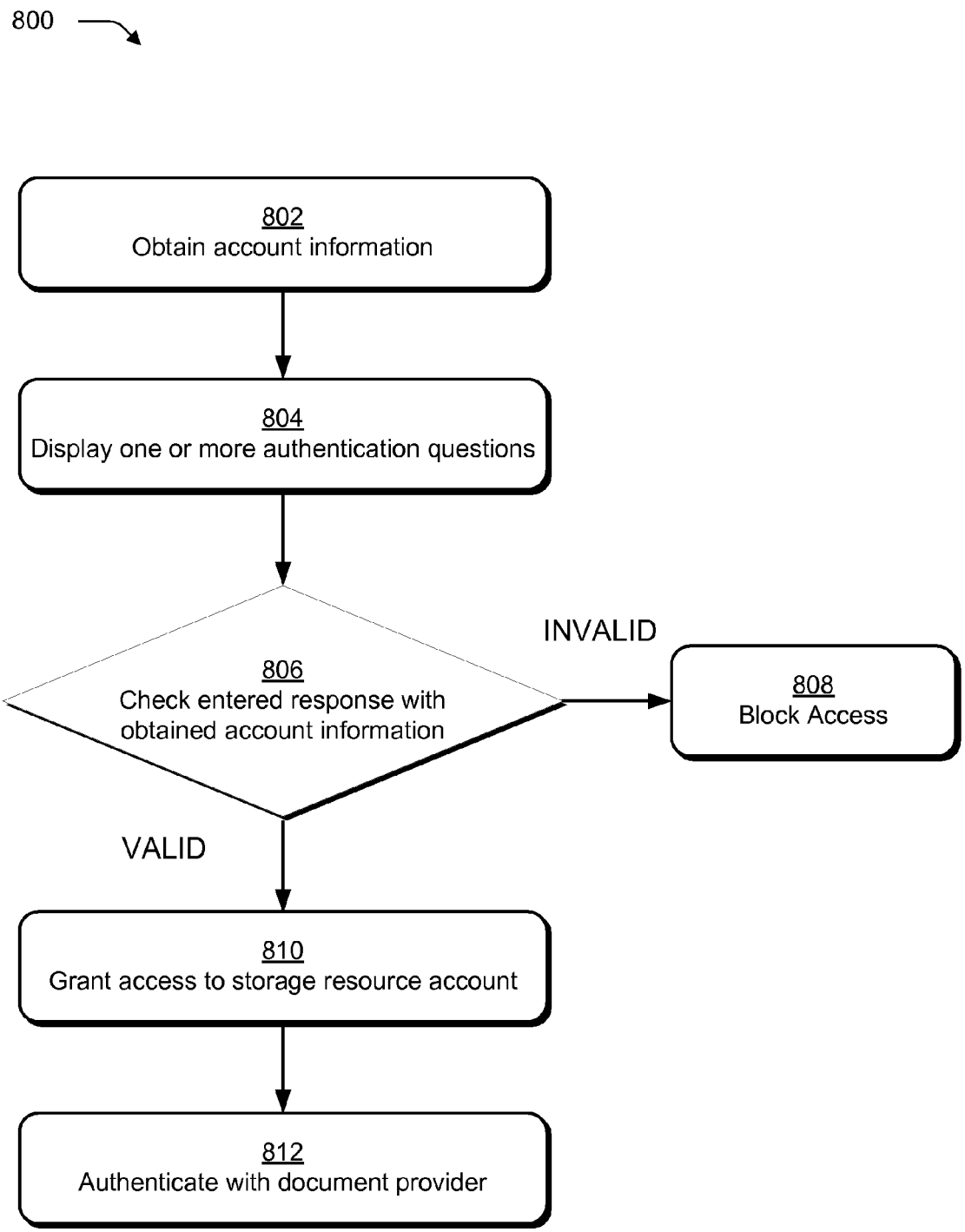
FIG. 8 is a flow diagram depicting a procedure in an example implementation used to authenticate with a document provider.

FIG. 8 depicts a procedure 800 in an example implementation in which authentication with a document provider is performed. By authenticating with the document provider according to the procedure 800, the user interface may automatically access an account via the web front end 120 with the document provider. In this way, the user interface 130 may be used to access the account with the document provider without manual authentication. Account information is obtained (block 802). Account information may include information for an account with the storage resource 104. In other instances, account information may also include information for an account with a document provider. In still other instances, common account information may be used for accounts with the storage resource 104 and one or more document providers 106. For example, the web service API 122 may obtain information, such as a user name and password for an account with the storage resource 104 and/or with one or more document providers 106.

One or more authentication questions are displayed (block 804). The authentication questions may be based on the account information. In some implementations, the user interface 130 displays one or more questions that may be used by the authentication module 210 to authenticate whether a user is to be granted access to an account with the storage resource 104 and one or more document providers 106.

In some embodiments, one or more questions may be displayed to test whether a human is entering a response to the display questions. For example, the user interface 130 that accesses the web front end 120 may display a human interaction proof (HIP) challenge that is used to check whether a human is responding to the display questions. HIP challenges may be display at various times, e.g., before authentication questions are displayed or with the authentication questions.

A check is made whether a response is valid based on the account information (decision block 806). For example, an entered response may be checked with previously obtained account information to determine whether access to the account is to be blocked or granted. When the check indicates the entered response does not match the obtained account information, access to the account with the storage resource is blocked (block 808).

In contrast, when the check indicates a valid response has been entered, access to the account with the storage resource is granted (block 810). For example, a user may be permitted access to an account with the storage resource 104 via the web front end in response to receiving a valid user name and password for the account.

An authentication with the document provider is performed (block 812), which may be done at various times. For example, the authentication may occur when access is granted to the account with the storage resource 104, or in response to receiving a user input for access to data stored with the document provider 106. A variety of other examples are also contemplated.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. One or more computer-readable storage media devices comprising instructions that are executable to:
    organize display of at least a portion of data included in a billing statement based on information specified by the billing statement's provider, the information specifying which of a plurality of tabs in a user interface the at least a portion of data is to be associated with for display;
    present a report for display with one of the plurality of tabs, the report including the at least a portion of data included in the billing statement, the at least a portion of data being associated with the billing statement such that the user interface is operable to display the billing statement upon selection of the at least a portion of data in the report; and
    present a targeted advertisement selected from a plurality of advertisements based on the at least a portion of data included in the billing statement to collect revenue, the targeted advertisement selected based on a change in the at least a portion of data in comparison to at least a portion of data included in a previous billing statement from the billing statement's provider.

2. One or more computer-readable storage media devices as described in claim 1, wherein the instructions are further executable to accept an advertisement from the billing statement's provider for display in the user interface with the at least a portion of data.

3. One or more computer-readable storage media devices as described in claim 1, wherein the instructions are further executable to allocate data storage capacity based on whether an account is scheduled to receive advertisements.

4. One or more computer-readable storage media devices as described in claim 1, wherein the instructions are further executable to allocate data storage capacity based on whether an account is associated with a reoccurring monthly fee.

5. One or more computer-readable storage media devices as described in claim 1, wherein the instructions are further executable for use in generating the report, for display with the one of the plurality of tabs, that includes the at least a portion of data with data included in an additional document that is also associated with the one of the plurality of tabs.

6. One or more computer-readable storage media devices as described in claim 1, wherein the instructions are further executable to authenticate with the billing statement's provider such that a single authentication is usable to access an account with the user interface and an account with the billing statement's provider.

7. One or more computer-readable storage media devices as described in claim 6, wherein the instructions are further executable to access the account with the billing statement's provider without manual authentication.

8. One or more computer-readable storage media devices as described in claim 1, wherein the instructions are further executable to share a copy of the billing statement and the at least a portion of data from a first account to a second account, in which the at least a portion of data is displayed in association with a particular one of the plurality of tabs in the second account according to how the at least a portion of data was displayed in the first account.

9. One or more computer-readable storage media devices as described in claim 1, wherein the information comprises financial information used to conclude a financial transaction.

10. A method comprising:
organizing display of at least a portion of data included in a document, by one or more modules implemented at least partially in hardware, based on information specified by the document's provider, the information specifying which of a plurality of tabs in a user interface the at least a portion of data is to be associated with for display;
presenting a report for display with one of the plurality of tabs, the report including the at least a portion of data included in the document;
associating the at least a portion of data in the report with the document, by the one or more modules implemented at least partially in hardware, such that the user interface is operable to display the document upon selection of the at least a portion of data in the report; and
presenting a targeted advertisement that is selected from a plurality of advertisements based on the at least a portion of data included in the document to collect revenue, the targeted advertisement selected based on a change in the at least a portion of data included in the document in comparison to at least a portion of data included in a previous issue of the document from the document's provider.

11. A method as recited in claim 10, further comprising generating a report, for display with one of the tabs, that includes the at least a portion of data with data included in an additional document that is also associated with the one of the tabs.

12. A method as recited in claim 10, further comprising authenticating with the document's provider by at least using a single authentication to access an account with the user interface and an account with the document's provider.

13. A method as recited in claim 10, further comprising accepting an advertisement from the document's provider for display in the user interface with the at least a portion of data.

14. A method as recited in claim 10, further comprising accepting information specified by the document's provider that is forwarded through an intermediary.

15. A system, comprising:
at least a memory and a processor to implement a web service application programming interface (API) configured to:
organize display of at least a portion of data included in a billing statement based on information specified by the billing statement's provider, the information specifying which of a plurality of tabs in a user interface the at least a portion of data is to be associated with for display; and
select a targeted advertisement from a plurality of advertisements based on the at least a portion of data included in the billing statement for presentation to collect revenue, the targeted advertisement selected based on a change in the at least a portion of data included in the billing statement in comparison to at least a portion of data included in a previous billing statement from the billing statement's provider, the targeted advertisement comprising an advertisement for a product or service based on the at least a portion of data included in the billing statement.

16. A system as recited in claim 15, wherein the information further specifies account information that is usable by the web service API to direct the billing statement for display.

17. A system as recited in claim 15, wherein the web service API is further configured to:
accept an advertisement from the billing statement's provider for display in the user interface with the at least a portion of data; and
offer the billing statement provider an opportunity to pay for presentation of the advertisement when the billing statement is accessed.

18. A system as recited in claim 15, wherein the web service API is further configured to accept information specified by the document's provider that is forwarded through an intermediary.

* * * * *